United States Patent [19]

Horna

[11] 4,411,006
[45] Oct. 18, 1983

[54] DIGITAL BIT RATE SYNCHRONIZER FOR DIGITAL ECHO CANCELLERS AND SIMILAR SIGNAL PROCESSING DEVICES

[75] Inventor: Otakar A. Horna, Bethesda, Md.

[73] Assignee: Communication Satellite Corporation, Washington, D.C.

[21] Appl. No.: 300,701

[22] Filed: Sep. 9, 1981

[51] Int. Cl.³ .......................................... H04B 7/015
[52] U.S. Cl. .................................. 375/102; 179/170.6; 364/164; 375/106
[58] Field of Search .............. 364/200, 131, 132, 136, 364/140, 143, 164, 165; 179/170.2, 170.6; 358/148, 149; 370/100, 103; 375/106, 107, 101, 102; 455/305, 304

[56] References Cited

U.S. PATENT DOCUMENTS

| | | |
|---|---|---|
| 3,504,126 | 3/1970 | Inose et al. ........................... 370/103 |
| 4,071,744 | 1/1978 | Pollock ................................. 364/164 |
| 4,074,086 | 2/1978 | Falconer et al. .................. 179/170.2 |
| 4,151,589 | 4/1979 | Ross ..................................... 364/164 |
| 4,253,181 | 2/1981 | Watten ................................ 370/103 |

Primary Examiner—Benedict V. Safourek
Attorney, Agent, or Firm—Sughrue, Mion, Zinn, Macpeak, and Seas

[57] ABSTRACT

In a digital echo canceller using an impulse response filter, an interpolating and synchronizing circuit is used to couple the received digital signals from the four-wire circuit to the input of the filter. The interpolation and synchronization circuit generates signals having values between the values of received digital samples, and these interpolated valves are then sampled at the send signal rate and supplied to the impulse response filter.

20 Claims, 4 Drawing Figures

DIGITAL BIT RATE SYNCHRONIZER FOR DIGITAL ECHO CANCELLERS AND SIMILAR SIGNAL PROCESSING DEVICES

BACKGROUND OF THE INVENTION

This invention is directed in general to signal processing devices which simultaneously process two digital signals which may be asynchronous. Although the invention is not limited thereto, it is specifically applicable to use in digital echo cancellers and will be described in that context.

It is conventional in long distance telephone circuits to utilize a hybrid coupling to interconnect the long distance four-wire line and the local two-wire line. As is well known, however, the coupling provided by the hybrid is not ideal, and a portion of the received signal will pass through the hybrid to the transmit line and will be returned to the speaker as an "echo". An effective means for eliminating this echo is the "echo canceller" which is now quite well known in the art and is described, for example, in U.S. Pat. No. 4,064,379 to O. A. Horna entitled "Logarithmic Echo Canceller", or in the article entitled "Echo Canceller With Adaptive Transversal Filter", by O. A. Horna, Comsat Technical Review, Vol. 7, No. 2, Fall, 1977, pages 393–428. In principle, the echo canceller will monitor the incoming signal and predict the resulting echo, and this predicted echo is then subtracted from the signal present on the transmit line to hopefully cancel the echo signal.

FIG. 1 is a brief block diagram of a conventional echo cancellation system. The signal $f_{si}$ received on line 10 is provided to the two-wire line 12 via the hybrid coupler 14 which includes an echo path by which a portion of the received signal $f_{si}$ is passed to the transmit side of the hybrid and would thus be returned to the distant party over the transmit line 16. The echo canceller essentially comprises an adaptive finite impulse response filter (AFIRF) 18 which predicts the echo at any given time based upon recent samples of the received signal, and the predicted echo is subtracted in adder 20 from the output signal $f_{so}$ of the hybrid. In the above-mentioned patent to Horna, the AFIRF receives its incoming signal input from amplifier 201 and its error signal input from sample-and-hold 222 and provides its output from D/A circuit 219. If the echo is correctly predicted, the subtraction of the echo prediction will eliminate entirely any echo component in the output signal $f_{so}$. Assuming that the near talker 22 is silent, and further assuming an ideal noise-free communications channel, there should be no signal on line 16 at the output of adder 20, and any signal which is present at the output of adder 20 will be fed back to the AFIRF to adjust the prediction algorithm. In reality, the echo canceller may include circuitry for compensating for both noise and for handling "double-talk" situations, as is well known in the art, but a description of these features is not necessary for a complete understanding of the present invention.

The difference between the true and computed echo, i.e., the "error" is used to compute an improved model of the unit impulse response stored in the memory of the AFIRF.

In many applications, the signals on the input and output lines 10 and 16 are analog, and the signals are sampled and the samples converted to digital form within the AFIRF. The prediction signal processing is then carried out digitally and the predicted echo is then converted to analog form for subtraction from the true echo. In these cases, it is a simple matter to sample the receive and send lines synchronously with the internal clock of the digital portion of the AFIRF.

A significant problem arises, however, if the echo canceller is utilized in a circuit which carries digitally encoded signals. In such a case, circuits 203, 204 and 219 of the Horna patent would be dispensed with. The send and receive signals are in the form of digital bit streams, and ideally both would have the same bit rate. However, due to the influence of a long distance transmission media, e.g., doppler shift of a satellite circuit or frequency tolerances of local clocks of A/D encoders, the bit rate of the receive signal $f_{si}$ can differ from the bit rate of the send signal $f_{so}$ by as much as $\pm 50$ parts per million. With an 8 kHz sampling rate, the sampling rates seen on the send and receive lines can differ by 0.4 Hz which will manifest itself as a $0.8\pi$/second "phase roll". This phase roll can substantially reduce the effectiveness of the echo canceller, as is well known in the art and as is described in the above-cited paper by Horna.

Since digital systems may transmit not only digitally encoded speech and video signals but also computer data, the rate of the digital bit stream at either the receive or send side cannot be altered without risking data loss. This substantially limits the possible solutions to the problem of asynchronous data rates. One possible solution is described in U.S. Pat. No. 4,074,086 to Falconer et al entitled "Joint Adaptive Echo Canceller and Equalizer for Two-wire Full-duplex Data Transmission". The technique disclosed therein is based on a special property of the equalizer, i.e., that the location of the most significant coefficients h in the coefficient memory can be fairly well predicted. When the receive and send bit stream are out of synchronism by nearly one-half of the sampling period, one least significant coefficient h is truncated or read twice from the memory to establish synchronism. This method is difficult to implement in a telephone echo canceller, since the location of the most significant coefficients changes with every connection.

SUMMARY OF THE INVENTION

It is an object of this invention to provide a method and apparatus for synchronizing two different bit streams in a signal processing device, and more particularly in a digital echo canceller.

It is a further object of this invention to provide such synchronization at a minimal cost and complexity.

It is a further object of this invention to provide a synchronization apparatus which can be implemented on a large scale integrated (LSI) chip.

Briefly, these and other objects are achieved in a first embodiment of the present invention by converting the incoming digital data to analog form, resampling the analog data with a clock synchronized to the send digital bit stream, and reconverting the sampled data to digital form for input to the AFIRF. In a second embodiment of the present invention, the necessity of the D/A conversion is eliminated by digitally interpolating the digital signal. This is accomplished by calculating the difference $\Delta$ between each presently received sample and the previous received sample, calculating an incremental value $\Delta/2^n$, where n is a positive integer, adding this incremental value $2^n$ times to the previous sample value and at a rate $2^n$ times the sampling rate of the received digital signal $f_{si}$. The addition results are continually maintained in an accumulator the output of which is sampled in synchronism with the $f_{so}$ sampling rate, with the sampled output of the accumulator being supplied to the AFIRF for processing.

BRIEF DESCRIPTION OF THE DRAWINGS

The invention will be more clearly understood from the following description in conjunction with the accompanying drawings wherein.

DETAILED DESCRIPTION OF THE PREFERRED EMBODIMENTS

Figure 1:
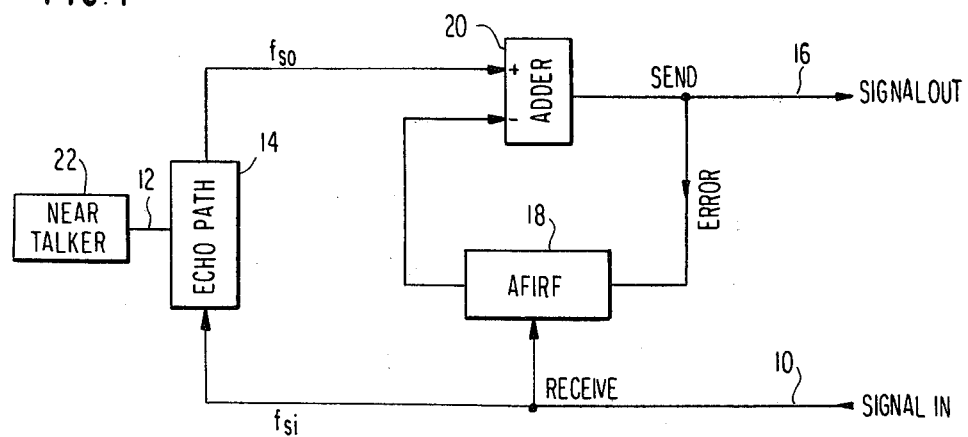
FIG. 1 is a brief block diagram, already described, of a conventional echo canceller configuration.

A first embodiment of the present invention will be described with reference to FIG. 2 wherein similar components are designated by the identical reference numerals of FIG. 1. The incoming digital signal on line 10 is converted to analog form by a D/A converter 24 and passed through a low pass filter (LPF) 26. The output of the LPF 26 will thus be a smooth analog voltage representing the information of the digital input signal. This analog voltage is then sampled in sample-and-hold circuit 28, and the analog samples are converted back to digital form by A/D converter 30 and supplied to the AFIRF 18 for processing.

The sample-and-hold circuit 28 is clocked by the output from a clock recovery circuit 32 which generates a clock signal synchronized to the bit rate of the output signal $f_{so}$. Accordingly, the bit rate at the output of A/D converter 30 will be synchronized to the bit rate of the output signal $f_{so}$, so that the output of the converter 30 can be used directly as the receive input of the AFIRF without encountering the "phase roll" problem characteristic of conventional echo cancellers. The chain of components 24–32 thus works as an interpolator and synchronizer of the digital bit streams. Further, as is clear from FIG. 2, the echo canceller utilizing the bit synchronizer according to the present invention is similar to a conventional echo canceller in that it does not change the incoming signal and also does not change the outgoing signal when the AFIRF is disabled.

The specific internal circuit details of the components 24–32 do not constitute a part of the present invention and will not be described herein since a wide variety of suitable circuits are quite well known in the art.

A second embodiment of the invention will now be described with reference to FIGS. 3 and 4. A disadvantage of the synchronization circuitry shown in FIG. 2 is the dual D/A and A/D conversion which prevents the device of FIG. 2 from being implemented on a large scale integrated (LSI) chip. The second embodiment of the invention shown in FIG. 3 will achieve similar results by purely digital means, i.e. it does not at any time require the conversion of the digital input signal into analog form.

Figure 3:
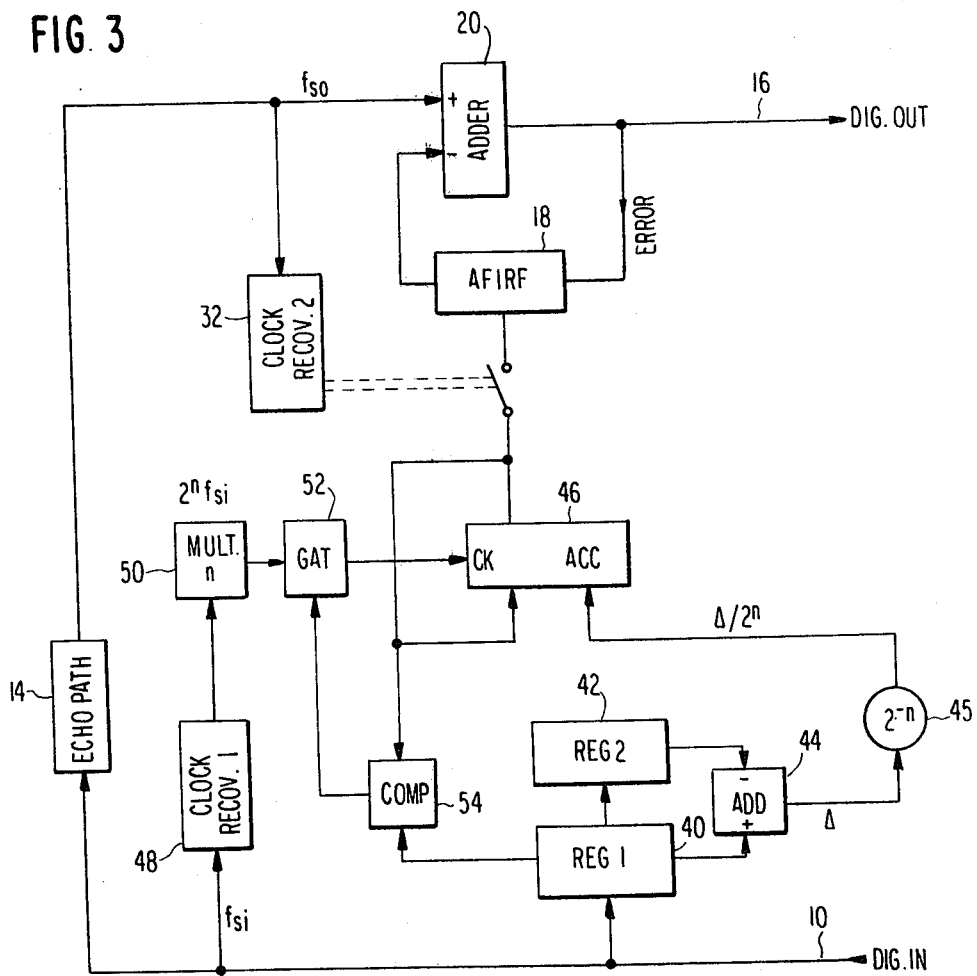
FIG. 3 is a block diagram of an all-digital second embodiment of the bit synchronizer according to the present invention.
Figure 4:
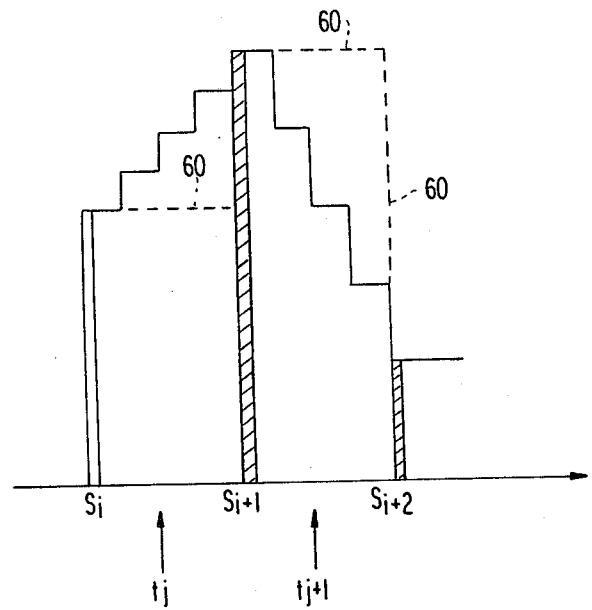
FIG. 4 is a waveform diagram of the output of the accumulator in FIG. 3.

In FIG. 3, each new incoming digital signal sample is stored in a first register 40, with the previous contents of the first register 40 being passed to the second register 42 so that the first and second registers 40 and 42 will always contain the present and previous incoming digital samples, respectively. An adder 44 compares the two samples and provides at its output a difference signal $\Delta$ corresponding to the digital value difference between the two samples. This difference is then divided by $2^n$, where n is a positive integer, to achieve an incremental value $\Delta/2^n$ which is provided as an input to an accumulator 26.

A first clock recovery circuit 48 recieves the digital input signal $f_{si}$ and generates a clock synchronized to the incoming bit rate. This clock signal is then provided to a multiplier 50 where it is multiplied by $2^n$, and the $2^n f_i$ clock signal is provided through a gate 52 to the clock input of the accumulator 46. Under the control of this $2^n f_{si}$ clock signal, the incremental value $\Delta/2^n$ is added to the accumulator contents until the comparator 54 indicates that the value in the accumulator is the same as the value of the present incoming digital sample in the first register 40, at which time the comparator 54 disables the gate 52 and interrupts the accumulation process.

Since the accumulation process continues until the contents of accumulator 46 and register 40 are equal, it will be understood that at the reception of the next incoming digital sample the first register contents are transferred to the second register 42. Thus, the value in accumulator 46 at this time will be the same as the previous incoming digital sample value now stored in register 42. In response to a difference between the present sample value in first register 40 and the previous sample value in accumulator 46, the comparator 54 will reopen gate 52 to begin incrementing the accumulator value toward the value now stored in the first register 40.

The output of the accumulator will be a digital signal having a level which changes in small amplitude steps $\Delta/2^n$, and the duration of each amplitude step will be $2^n$ times smaller than the duration of the sampling interval $1/f_{si}$ of the incoming digital signal. FIG. 4 illustrates a typical waveform at the output of the accumulator 46. In FIG. 4, $s_i$, $s_{i+1}$ and $s_{i+2}$ represent three successive samples of the received digital signal $f_{si}$. Instead of changing abruptly from one value to the next as is shown by the dotted line 60, the output of the accumulator changes in smaller steps. Note that for a given value of n, the step size will change in accordance with the difference $\Delta$ between successive samples.

Figure 2:
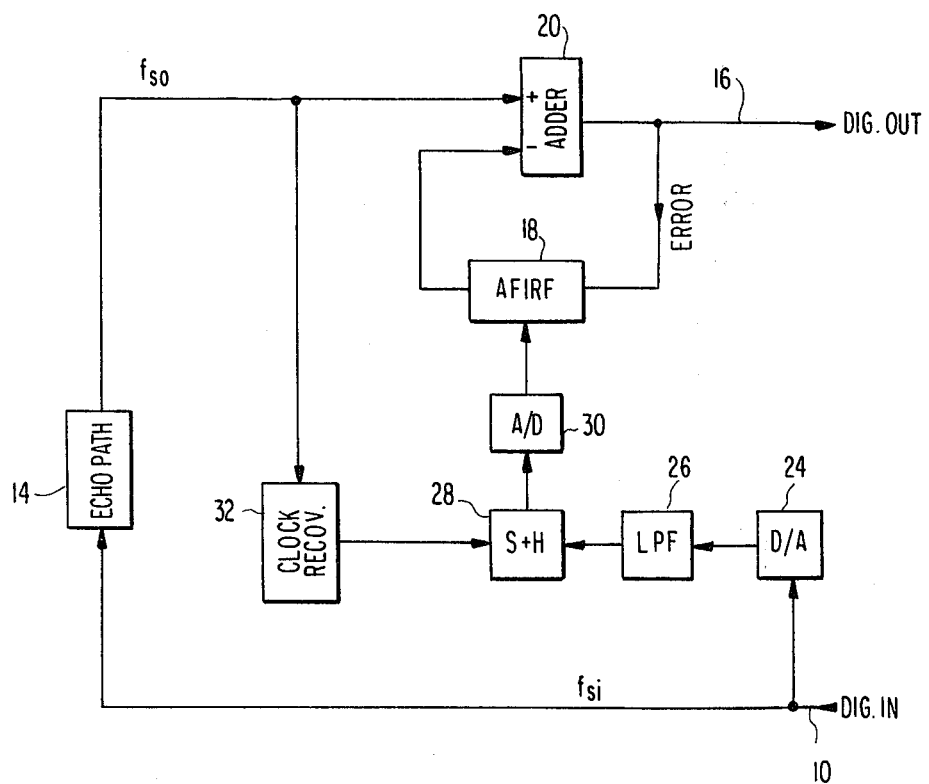
FIG. 2 is a block diagram of the essential components of the bit rate synchronizer according to the present invention.

The clock recovery circuit 32 in FIG. 3 is identical to that in FIG. 2 and generates a clock signal synchronized to the send signal $f_{so}$. This clock signal is then used to sample the output of the accumulator 46, which samples will be supplied as the digital input signals to the AFIRF 18. As shown in FIG. 4, if the incoming and outgoing bit rates are out of synchronization and the accumulator output is sampled at times $t_j$ and $t_{j+1}$ in synchronism with the digital signal $f_{so}$, the error caused by the lack of synchronization will be reduced by some factor less than or equal to $2^n$.

As is the case in the embodiment of FIG. 2, the embodiment of FIG. 3 uses easily available conventional hardware components, and the internal circuit details of these components do not constitute a part of the present invention and need not be described in detail herein. As is well known, assuming that a common binary code is used, the division by $2^n$ in divider 45 is tantamount to merely shifting the binary representation of $\Delta$ by n binary places to the right. Thus, the divider 45 could be implemented by a simple shift register.

The common principle employed in both embodiments of FIGS. 2 and 3 is that of interpolation and synchronization. In each case, a signal is generated which changes gradually between the values of successive samples of the input signal $f_{si}$, in FIG. 2 this gradual changing, or "interpolation", of the input signal being performed by the LPF 26 and in FIG. 3 the interpolation being performed by all of the components 40-52 with the interpolated signal being present at the output of accumulator 46. In each of the embodiments of FIGS. 2 and 3, the interpolated signal is then sampled in synchronism with the output signal $f_{so}$ under control of the output from clock recovery circuit 32.

Theoretically, the embodiment of FIG. 3 is inferior to the analog approach of FIG. 2, since the interpolation between successive samples is linear in FIG. 3, but the advantage of the embodiment of FIG. 3 is that it can be implemented by common digital hardware in a LSI chip. The analog circuit of FIG. 2 will provide a higher order of interpolation, depending on the characteristics of the LPF, but is substantially more complex and, therefore, more sensitive to circuit tolerances and design limitations.

What is claimed is:

1. A digital signal processing device for receiving and processing first and second digital input signals at first and second device inputs, respectively, said second digital signal comprising at least first and second consecutive samples representing first and second values, respectively, said device comprising:
   a signal processor (e.g. 18, 20) having first and second signal processor inputs and for processing signals received at said first and second processor inputs, said first signal processor input comprising said first device input; and
   coupling means, including interpolation and synchronization means, for receiving said at least first and second consecutive samples of said second digital input signal and for providing a signal to said second signal processor input which is derived from said second digital input signal, is synchronized in time with said first digital input signal and represents a value between said first and second values.

2. A digital signal processing device as defined in claim 1, wherein said interpolation and synchronization means comprises:
   means for generating from said second digital input signal an interpolated signal representing at least one intermediate value between said first and second values; and
   sampling means synchronized with said first digital input signal for sampling said interpolated signal and providing an interpolated signal sample to said second signal processor input.

3. A digital signal processing device as defined in claim 2, wherein said means for generating said interpolated signal comprises:
   digital to analog conversion means for converting said second digital input signal to a first analog signal having at least first and second levels corresponding to said first and second values, respectively; and
   interpolating means for receiving said first analog signal and generating therefrom a second analog signal having gradual transitions between said first and second levels; and
   wherein said sampling means comprises: means for sampling said second analog signal in synchronism with said first digital input signal; and analog to digital conversion means for converting said second analog signal samples to digital form and for supplying said digital form samples to said second input of said signal processor.

4. A signal processing device as defined in claim 3, wherein said means for sampling said second analog signal comprises:
   clock recovery means for generating a recovered clock signal synchronized with said first digital input signal; and
   sample-and-hold means clocked by said recovered clock signal for sampling said second analog signal.

5. A signal processing device as defined in claim 3, wherein said interpolating means is a low pass filter.

6. A signal processing device as defined in claim 1, wherein said interpolation and synchronization means comprises:
   means for generating from said second digital input signal a third digital signal representing at least one intermediate value between said first and second values; and
   sampling means synchronized with said first digital input signal for sampling said third digital signal and providing third digital signal samples to said second input of said signal processor.

7. A signal processing device as defined in claim 6, wherein said means for generating said third digital signal comprises:
   means for determining a difference $\Delta$ between said first and second values;
   means for generating an incremental value signal representing an incremental value $\Delta/m$, where m is an integer; and
   means for repetitively adding said incremental value signal to said first value to generate said third digital signal changing from said first to said second values in increments of $\Delta/m$.

8. A signal processing device as defined in claim 7, wherein said means for determining comprises:
   a first register for storing said first consecutive sample of said second digital input signal;
   a second register for storing said second consecutive sample of said second digital input signal; and
   comparison means for comparing the contents of said first and second registers.

9. A signal processing device as defined in claim 7, wherein said means for repetitively adding comprises:
   an accumulator receiving said incremental value signal as an accumulator input and providing an accumulator output, said accumulator adding said accumulator input and output in response to an accumulator clock signal;
   clock means for generating clock pulses at a rate of $mf_{si}$, where $f_{si}$ is the sample rate of said second digital input signal; and
   comparison means for comparing said accumulator output to said second value, said comparison means enabling said clock means when said accumulator output and second value are different and disabling said clock means when the value of said accumulator output reaches said second value.

10. A digital signal processing device as defined in claim 9, wherein said clock means comprises:
    clock recovery means receiving said second digital input signal and generating a clock signal having a rate $f_{si}$;

clock multiplication means for receiving the output of said clock recovery means and providing a clock signal having a rate $m_{fsi}$; and gate means for passing the output of said clock multiplication means to said accumulator when enabled, said gate means being controlled by said comparison means.

11. A digital signal processing device as defined in claim 9, wherein $m = 2^n$, where n is an integer.

12. A digital signal processing device as defined in any one of claims 3–5, wherein said signal processor is an echo canceller for predicting an echo from a receive signal and subtracting said predicted echo from a send signal, said first digital input signal comprising said send signal and said second digital input signal comprising said receive signal.

13. An echo canceller for receiving a receive digital signal having at least first and second consecutive samples representing first and second values, respectively, and predicting an echo from said receive digital signal and for subtracting said predicted echo from a send digital signal, said echo canceller comprising:

a signal processor (e.g. 18, 20) having first and second signal processor inputs, said signal processor generating a predicted echo signal in accordance with a signal received at said second signal processor input and subtracting said predicted echo signal from a signal received at said first signal processor input, said signal processor receiving said send digital signal at said first signal processor input; and coupling means, including interpolation and synchronization means, for receiving said at least first and second consecutive samples of said receive digital signal and for providing a signal to said signal processor input which is derived from said receive digital signal, is sychronized in time with said send digital signal and represents a value between said first and second values.

14. An echo canceller as defined in claim 13, wherein said interpolation and synchronization means comprises:

means for generating from said receive digital signal an interpolated signal representing at least one intermediate value between said first and second values; and sampling means synchronized with said send digital signal for sampling said interpolated signal and providing an interpolated signal sample to said second signal processor input.

15. An echo canceller for receiving a receive digital signal having at least first and second consecutive samples representing first and second sample values, respectively, and predicting an echo from said receive digital signal and for subtracting said predicted echo from a send digital signal, said echo canceller comprising:

a signal processor (e.g. 18, 20) having first and second signal processor inputs, said signal processor generating a predicted echo signal in accordance with a signal received at said second signal processor input and subtracting said predicted echo signal from a signal received at said first signal processor input, said signal processor receiving said send digital signal at said first signal processor input; and coupling means, including interpolation and synchronization means, for receiving said at least first and second consecutive samples of said receive digital signal and for providing a signal to said second signal processor input which is derived from said receive digital signal, is synchronized in time with said send digital signal and represents a value between said first and second values, said interpolation and synchronization means comprising means for generating from said receive digital signal a third digital signal representing at least one intermediate value between said first and second values and sampling means synchronized with said send digital signal for sampling said third digital signal and providing third digital signal samples to said second signal processor input.

16. An echo canceller as defined in claim 15, wherein said means for generating said third digital signal comprises:

means for determining a difference $\Delta$ between said first and second values;

means for generating an incremental value signal representing an incremental value $\Delta/m$, where m is an integer; and means for repetitively adding said incremental value signal to said first value to generate said third digital signal changing from said first to said second value in increments of $\Delta/m$.

17. An echo canceller as defined in claim 16, wherein said means for determining comprises:

a first register for storing said first consecutive sample of said receive digital signal;

a second register for storing said second consecutive sample of said receive digital signal; and comparison means for comparing the contents of said first and second registers.

18. An echo canceller as defined in claim 16, wherein said means for repetitively adding comprises:

an accumulator receiving said incremental value signal as an accumulator input and providing an accumulator output, said accumulator adding said accumulator input and output in response to an accumulator clock signal;

clock means for generating clock pulses at a rate of $m_{fsi}$, where fsi is the sample rate of said receive digital signal; and comparison means for comparing said accumulator output to said second value, said comparison means enabling said clock means when said accumulator output and second value are different and disabling said clock means when the value of said accumulator output reaches said second value.

19. An echo canceller as defined in claim 18, wherein said clock means comprises:

clock recovery means receiving said receive digital signal and generating a clock signal having a rate $f_{si}$;

clock multiplication means for receiving the output of said clock recovery means and providing a clock signal having a rate $m_{fsi}$; and gate means for passing the output of said clock multiplication means to said accumulator when enabled, said gate means being controlled by said comparison means.

20. An echo canceller as defined in claim 18, wherein $m = 2^n$, where n is an integer.

* * * * *